United States Patent
Waldie et al.

(10) Patent No.: US 9,963,561 B2
(45) Date of Patent: May 8, 2018

(54) PHENOL FREE STABILIZATION OF POLYETHYLENE

(71) Applicant: NOVA Chemicals (International) S.A., Fribourg (CH)

(72) Inventors: Fraser D. Cole Waldie, Calgary (CA); Owen C. Lightbody, Calgary (CA); Tony Tikuisis, Calgary (CA); P. Scott Chisholm, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days. days.

(21) Appl. No.: 15/352,964

(22) Filed: Nov. 16, 2016

(65) Prior Publication Data
US 2017/0145171 A1    May 25, 2017

(30) Foreign Application Priority Data
Nov. 25, 2015 (CA) .................................. 2913280

(51) Int. Cl.
| | |
|---|---|
| *C08J 3/20* | (2006.01) |
| *C08J 5/18* | (2006.01) |
| *C08K 5/17* | (2006.01) |
| *C08K 5/18* | (2006.01) |
| *C08K 5/524* | (2006.01) |
| *C08K 5/526* | (2006.01) |

(52) U.S. Cl.
CPC ................. *C08J 3/203* (2013.01); *C08J 5/18* (2013.01); *C08K 5/17* (2013.01); *C08K 5/524* (2013.01); *C08K 5/526* (2013.01); *C08J 2323/08* (2013.01); *C08K 2201/014* (2013.01); *C08K 2201/019* (2013.01)

(58) Field of Classification Search
CPC .......... C09J 3/203; C09J 5/18; C09J 2323/08; C08K 5/524; C08K 5/17
See application file for complete search history.

(56) References Cited

U.S. PATENT DOCUMENTS

| | | |
|---|---|---|
| 4,611,016 A | 9/1986 | Hinsken et al. |
| 5,596,033 A | 1/1997 | Horsey et al. |
| 5,844,029 A | 12/1998 | Prabhu et al. |
| 5,883,165 A | 3/1999 | Krohnke et al. |
| 6,077,890 A | 6/2000 | Hudson et al. |
| 6,664,317 B2 | 12/2003 | King, III |
| 7,361,703 B2 | 4/2008 | Tikuisis et al. |
| 2009/0221755 A1* | 9/2009 | Aoki .................. C08L 67/04 525/190 |

OTHER PUBLICATIONS

Standler, Urs; Impact of Stabilization Additives on the Controlled Degradation of Polypropylene; Polyolefins 2001, The International Conference on Polyolefins, Houston, TX, Feb. 25-28, 2001; pp. 521-542.
ASTM D1238-13; Standard Test Method for Melt Flow Rates of Thermoplastics by Extrusion Plastometer; Copyright ASTM International; Current edition approved Aug. 1, 2013. Published Aug. 2013. Originally approved in 1965. Last previous edition approved in 2010 as D1238-10, pp. 1-16.

* cited by examiner

*Primary Examiner* — Robert Harlan
(74) *Attorney, Agent, or Firm* — Julie L. Heinrich

(57) ABSTRACT

This invention provides a process for the stabilization of thermoplastic polyolefins during melt processing operations. The stabilizer package of this invention is "phenol free" and comprises at least two selected phosphite stabilizers. In some embodiments, the process is suitable for the manufacture of polyethylene film.

6 Claims, No Drawings

PHENOL FREE STABILIZATION OF POLYETHYLENE

This disclosure relates to the melt processing of polyolefins using a stabilizer which is essentially free of any phenolic antioxidant.

Polyolefins are conventionally stabilized with a phenolic antioxidant and a phosphite. A hindered amine light stabilizer (or "HALS") may also be included if long term stabilization is desired. In some embodiments, these formulations provide adequate stabilization performance during the melt processing operations which are used to produce finished plastic parts from the thermoplastic polyolefin resin and during the normal lifetime of the parts.

A general overview of phenol/phosphite stabilizer systems is provided in Polyolefins 2001—The International Conference on Polyolefins, "Impact of Stabilization Additives on the Controlled Degradation of Polypropylene", p. 521, presented by Urs Stadler of Ciba Specialty Chemicals Corporation. For convenience, a summary of the teachings of this paper is provided below. It is generally accepted that:

1. Carbon centered radicals (or "CCRs") are formed when polyolefins are subjected to heat and sheer during melt processing;
2. CCRs react with oxygen to form peroxy radicals (or "PRs"); and
3. PR's react with the polyolefin to form hydroperoxides (or "HPs") and more CCRs.

In a conventional phenol/phosphite stabilizer system, it is generally accepted that:

1. the phenolic (which is also referred to as the "primary" antioxidant) decomposes the carbon centered radicals and peroxy radicals; and
2. the phosphite (which is also referred to as the "secondary" antioxidant) decomposes the hydroperoxides.

In addition, it is generally accepted that (a) the phenolic antioxidant provides a synergistic effect at the temperatures which are encountered during melt processing by reducing the rate at which the phosphite is depleted or consumed; and (b) if/when the phosphite is depleted (to below the concentration which is required for the decomposition of the hydroperoxides) then the structure of the polyolefin is altered by the action of the free radicals. In polypropylene, this generally results in "chain scission" (a reduction in the molecular weight of the polypropylene) whereas "crosslinking" is generally believed to predominate in polyethylene (which results in an increase in apparent molecular weight).

Stabilizer packages which comprise a combination of a phenolic antioxidant and a phosphite are in wide spread commercial use and generally provide efficient and cost effective results.

However, the use of phenolics is associated with color development in the finished plastic parts, especially in polyethylene or polypropylene which is produced with a transition metal catalyst (such as titanium, vanadium, zirconium or chromium). For example, "yellowing" and "pinking" have been observed in plastic parts which are stabilized with a phenolic antioxidant.

Thus, as noted in U.S. Pat. No. 5,596,033: "there is a long-felt need in the market place for a stabilizer system which can prevent color formation associated with the use of phenolic antioxidants".

Several "phenol free" stabilization systems have been proposed and brief overviews of several of these systems follow:

1. Phosphites plus hindered amines (HALS): these phenol free systems are reported to lack adequate process stabilization (see U.S. Pat. No. 5,596,033).
2. N,N-dialkylhydroxylamine plus HALS: these phenol free systems are expensive (due to the high cost of the hydroxylamine) and may have restricted use in certain food contact applications due to FDA regulations (again, due to the presence of the hydroxylamine) (U.S. Pat. No. 5,596,033).
3. HALS, plus hydroxylamine (or nitrone) plus phosphite: as above, these phenol free systems are expensive and may have restrictions upon their use (U.S. Pat. No. 6,664,317).
4. HALS plus hydroxylamine plus a mixture of two hydrolytically resistant phosphites: as above, these phenol free systems are expensive and may have restrictions upon their use (U.S. Pat. No. 6,077,890).
5. Lactones (such as benzofuranone) plus HALS: these phenol free systems are also expensive (due to the high cost of the lactone) and may have restricted use due to FDA regulations concerning the use of lactones (U.S. Pat. No. 5,883,165).
6. Combination of aryl monophosphite with a diphosphite: these dual phosphite systems are subject to solubility limitations that restrict the use of the systems in some cast film applications (U.S. Pat. No. 7,361,703).

We have now discovered an effective low cost, phenol free stabilization package for the melt processing of polyolefins.

The present invention provides a process for stabilizing a thermoplastic polyolefin during melt processing conditions, said process comprising the step of incorporating into said thermoplastic polyolefin a stabilizer package comprising:

i. a first phosphite: tris(2-4-di-tert-butylphenyl)phosphite; and
ii. a second phosphite composition consisting essentially of:
phosphorous acid, mixed 2,4-bis(1,1-dimethylpropyl) phenyl and 4-(1,1-dimethylpropyl) phenyl triesters;
and subjecting said thermoplastic polyolefin to sufficient temperature to melt said polyolefin;
with the proviso that said stabilizer package is essentially free of any additive selected from hindered phenolic antioxidants, lactone stabilizers and hydroxylamine stabilizers.

This disclosure relates to the melt processing of polyolefins using a stabilizer system which is essentially free of phenolic antioxidant.

The "phenol free" melt processing operation disclosed herein is generally suitable for any thermoplastic polyolefin, for example, thermoplastic polypropylene and polyethylene. In some embodiments thermoplastic polyolefins are prepared with a transition metal catalyst such as titanium, vanadium, zirconium or chromium.

In some embodiments, the disclosed materials are suitable for polyolefins that contain from about 0.5 parts per million by weight ("ppm") to about 10 parts per million by weight of transition metal residue. (The process disclosed herein may not provide complete process stabilization if the polyolefin contains more than 10 parts per million transition metal and the process of this invention may not be required if the polyolefin contains less than 0.5 ppm of transition metal). In addition, the polyolefin may contain magnesium residues (in amounts up to 500 ppm); aluminum residues (in amounts up to 150 ppm); and chlorine residues (in amounts up to 200 ppm). In some embodiments, the compositions disclosed herein comprise less than 100 ppm, or less than 50 ppm, or less than 1 ppm of phenol.

In some embodiments, the thermoplastic polyolefin is a linear polyethylene having:

(i) a density of from 0.880 grams per cubic centimeter (g/cc) to 0.960 grams per cubic centimeter (g/cc)—or for example from 0.910 to 0.945 g/cc; and (ii) a melt index, $I_2$, as determined by ASTM D 1238 of from 0.3 (grams per 10 minutes) to 150, or for example from 1 to 100, or for example from 1.5 to 5.

In some embodiments, the linear polyethylene comprises copolymers of ethylene with at least one other olefin selected from butene, pentene, hexene, and octene. These thermoplastic polyethylenes may be produced in any of the known polymerization processes (such as a gas phase process, a slurry process or a solution process) using any known polymerization catalyst (such as a chromium catalyst, a Ziegler Natta catalyst or a single site catalyst such as a metallocene catalyst or a so-called "constrained geometry catalyst".

The melt processing process of this invention is characterized by:

(1) the use of a first phosphite (described in part A below);

(2) the use of a second phosphite (described in part B below); and (3) that the melt processing is essentially free of a phenolic antioxidant or hydroxylamine or lactone stabilizer (described in part D below).

In addition to the two phosphites, in some embodiments, the stabilizer package used in the present invention further comprises an acid neutralizer (described in Part C.1 below). In some embodiments, the finished part that is made in accordance with the disclosure herein is intended for long term use and further comprises the use of additional stabilizers (for example, HALS) as described in C.2 below. Other conventional additives may also be included.

Part A

First Phosphite

The first phosphite is tris(2-4-di-tert-butylphenyl)phosphite (CAS Reg. No. 31570-04-4). This phosphite is commercially available under the trademark IRGAFOS I-168.

Part B

Second Phosphite

The second phosphite is not a discrete molecule. It is a mixture of molecules that is defined as: phosphorous acid, mixed 2,4-bis(1,1-dimethylpropyl)phenyl and 4-(1,1-dimethylpropyl) phenyl triesters.

The CAS registry number for the second phosphite is 9390402-02-5. The second phosphite is commercially available under the trademark WESTON™ 705.

In an embodiment, each of the first phosphites and the second phosphite composition is used in amounts of from 200 ppm to 2,000 ppm, preferably from 300 to 1,500 ppm and most preferably from 400 to 1,000 ppm.

Part C.1—Acid Neutralizers

Many commercially available polyolefins contain chloride residues. These chloride residues may generate hydrochloric acid, particularly during melt processing operations. Accordingly, an "acid neutralizer" is conventionally included in a polyolefin stabilization package and, in some embodiments, is included in the process of this invention.

These acid neutralizers may be divided into "Inorganic"—such as zinc oxide, synthetic hydrotalcites and Li, Na, Ca or Al (hydroxy) carbonates; and "Organic"—such as salts of fatty acids or their derivatives including calcium stearate, zinc stearate, calcium lactate and calcium stearoyl lactylate.

When employed, these conventional acid neutralizers are used in conventional amounts. It is preferred to use a synthetic hydrotalcite (for example, in an amount of from 100 to 1,000 ppm), zinc stearate (for example, in an amount of from 200 to 700 ppm) or calcium stearoyl lactylate (for example, in an amount of from 200 to 700 ppm). A combination of a hydrotalcite with an "organic" acid neutralizer is highly preferred.

Part C.2—Long Term Stabilizers

Plastic parts which are intended for long term use preferably contain at least one HALS (C.2.1).

Part C.2.1—HALS

A hindered amine light stabilizer (HALS) is preferably included in the stabilizer package used in the present invention, if the plastic part is intended for more than single/short term use.

HALS are well known to those skilled in the art.

When employed, the HALS is preferably a commercially available material and is used in a conventional manner and amount.

Commercially available HALS include those sold under the trademarks CHIMASSORB™ 119; CHIMASSORB 944; CHIMASSORB 2020; TINUVIN™ 622 and TINUVIN 770 from Ciba Specialty Chemicals Corporation, and CYASORB™ UV 3346, CYASORB UV 3529, CYASORB UV 4801, and CYASORB UV 4802 from Cytec Industries. In some embodiments, TINUVIN 622 is preferred. Mixtures of more than one HALS are also contemplated.

Suitable HALS include: bis (2,2,6,6-tetramethylpiperidyl)-sebacate; bis-5 (1,2,2,6,6-pentamethylpiperidyl)-sebacate; n-butyl-3,5-di-tert-butyl-4-hydroxybenzyl malonic acid bis(1,2,2,6,6-pentamethylpiperidyl)ester; condensation product of 1-hydroxyethyl-2,2,6,6-tetramethyl-4-hydroxypiperidine and succinic acid; condensation product of N,N'-(2,2,6,6-tetramethylpiperidyl)-hexamethylendiamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl-4-piperidyl)-1,2,3,4butane-tetra-arbonic acid; and 1,1'(1,2-ethanediyl)-bis-(3,3,5,5-tetramethylpiperazinone).

Part C.2.2—Other Optional Additives

C.2.2.1 2-(2'-hydroxyphenyl)-benzotriazoles

For example, the 5'-methyl-,3'5'-di-tert-butyl-,5'-tert-butyl-,5'(1,1,3,3-tetramethylbutyl-)-5-chloro-3',5'-di-tert-butyl-,5-chloro-3'-tert-butyl-5'-methyl-3'-sec-b-utyl-5'-tert-butyl-,4'-octoxy,3',5'-ditert-amyl-3',5'-bis-(alpha, alpha-di methylbenzyl)-derivatives.

C.2.2.2 2 Hydroxy-Benzophenones

For example, the 4-hydroxy-4-methoxy-,4-octoxy,4-decyloxy-,4-dodecyloxy-,4-benzyloxy,4,2'-4'-trihydroxy- and 2'-hydroxy-4,4'-dimethoxy derivative.

C.2.2.3 Esters of Substituted and Unsubstituted Benzoic Acids

For example, phenyl salicylate; 4-tertbutylphenyl-salicilate; octylphenyl salicylate; dibenzoylresorcinol; bis-(4-tert-butylbenzoyl)-resorcinol; benzoylresorcinol; 2,4-di-tert-butyl-phenyl-3,5-di-tert-butyl-4-hydroxybenzoate; and hexadecyl-3,5-di-tert-butyl-4-hydroxybenzoate.

C.2.2.4 Acrylates

For example, alpha-cyano-.beta,.beta.-diphenylacrylic acid-ethyl ester or isooctyl ester; alpha-carbomethoxy-cinnarnic acid methyl ester; alpha-cyano-.beta.-methyl-p-methoxy-cinnamic acid methyl ester or butyl ester; alpha-carbomethoxy-p-methoxy-cinnamic acid methyl ester; and N-(beta-carbomethoxy-beta-cyano-vinyl)-2-methyl-indoline.

C.2.2.5 Nickel Compounds

For example, nickel complexes of 2,2'-thio-bis(4-(1,1,1,3-tetramethylbutyl)-phenol), such as the 1:1 or 1:2 complex, optionally with additional ligands such as n-butylamine, triethanolamine or N-cyclohexyl-diethanolamine; nickel dibutyldithiocarbamate; nickel salts of 4-hydroxy-3,5-di-tert-butylbenzylphosphonic acid monoalkyl esters, such as of the methyl, ethyl, or butyl ester; nickel complexes of ketoximes such as of 2-hydroxy-4-methyl-phenyl undecyl ketoxime; and nickel complexes of 1-phenyl-4-lauroyl-5-hydroxy-pyrazole, optionally with additional ligands.

C.2.2.6 Oxalic Acid Diamides

For example, 4,4'-di-octyloxy-oxanilide; 2,2'-di-octyloxy-5',5'-ditert-butyloxanilide; 2,2'-di-dodecyloxy-5',5'di-tert-butyl-oxanilide; 2-ethoxy-2'-ethyl-oxanilide; N,N'-bis(3-dimethylaminopropyl)-oxalamide; 2-ethoxy-5-tert-butyl-2'-ethyloxanilide and its mixture with 2-ethoxy-2'-ethyl-5,4-di-tert-butyloxanilide; and mixtures of ortho- and para-methoxy as well as of o- and p-ethoxy-disubstituted oxanilides.

C.2.2.7 Hydroxyphenyl-s-triazines

For example, 2,6-bis-(2,4-dimethylphenyl)-4-(2-hydroxy-4octyloxyphenyl)-s-triazine; 2,6-bis(2,4-dimethylphenyl)-4-(2,4-dihydroxyphenyl)-s-triazine; 5 2,4-bis(2,4-dihydroxyphenyl)-6-(4-chlorophenyl)-s-triazine; 2,4-bis(2-hydroxy-4-(2-hydroxyethoxy)phenyl)-6-(4-chlorophenyl)-s-triazin-e; 2,4-bis(2hydroxy-4-(2-hydroxyethoxy)phenyl)-6-phenyl-s-triazine; 2,4-bis(2-hydroxy-4-(2-hydroxyethoxy)-phenyl)-6-(2,4-dimethylphenyl)-s-tr-iazine; 2,4-bis(2-hydroxy-4-(2-hydroxyethoxy)phenyl)-6-(4-bromo-phenyl)-s-triazine; 2,4-bis(2-hydroxy-4-(2-acetoryethoxy)phenyl)-6-(4-chlorophenyl)-s-triazine; and 2,4-bis(2,4-dihydroxyphenyl)-6-(2,4-dimethylphenyl)-1-s-triazine.

C.2.2.8 Metal Deactivators

For example, N,N'diphenyloxalic acid diamide; N-salicylal-N'-salicyloylhydrazine; N,N'-bis-salicyloylhydrazine; N,N'-bis-(3,5-di-tert-butyl-4-hydrophenylpropionyl)-2-hydrazine; salicyloylarnino-1,2,4-triazole; and bis-benzylidenoxalic acid dihydrazide.

C.2.2.9 Peroxide Scavengers

For example, esters of betathiodipropionic acid, for example the lauryl, stearyl, myristyl or tridecyl esters; mercaptobenzimidazole or the zinc salt of 2-mercaptobenzimidazole; zinc-dibutyldithiocarbamate; dioctadecyldisulfide; and pentaerythritottetrakis-(beta-dodecylmercapto)-propionate.

C.2.2.10 Polyamide Stabilizers

For example, copper salts in combination with iodides and/or phosphorus compounds and salts of divalent manganese.

C.2.2.11 Nucleating Agents

For example, 4-tert-butylbenzoic acid; adipic acid; diphenylacetic acid; sodium salt of methylene bis-2,4-dibutylphenyl; cyclic phosphate esters; sorbitol tris-benzaldehyde acetal; and sodium salt of bis(2,4-di-t-butylphenyl) phosphate or Na salt of ethylidene bis(2,4-di-t-butyl phenyl) phosphate.

C.2.2.12 Fillers and Reinforcing Agents

For example, calcium carbonate; silicates; glass fibers; asbestos; talc; kaolin; mica; barium sulfate; metal oxides and hydroxides; carbon black and graphite.

C.2.2.13 Miscellaneous Additives

For example, plasticizers; epoxidized vegetable oils, such as epoxidized soybean oils; lubricants; emulsifiers; polymer process additives (e.g., fluoroelastomers); pigments; optical brighteners; flameproofing agents; anti-static agents; blowing agents and thiosynergists, such as dilaurythiodipropionate or distearylthiodipropionate.

The term "phenol free" has been used herein to refer to a stabilizer package which is "essentially free" of any "primary" antioxidant such as a phenolic, lactone or hydroxylamine. The phrase "essentially free" is meant to convey a plain meaning, namely that none of the phenolic (or lactone or hydroxylamine) is deliberately added to the polyolefin in order to achieve the melt stabilization of this invention. In some embodiments the compositions disclosed herein comprise less than 100 ppm, or less than 50 ppm, or less than 1 ppm of the excluded additive or stabilizer. The "excluded" stabilizers (i.e. the stabilizers which are not deliberately added to the polyolefin according to this invention) are described in Part D below.

Part D—Excluded Stabilizers

The process of this invention utilizes a stabilizer package which is essentially free of phenolic antioxidants, hydroxyl amines (and amine oxides) and lactones.

Part D.1—Phenolic Antioxidants

D.1.1 Alkylated Mono-Phenols

For example, 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4isobutylphenol; 2,6-dicyclopentyl-4-methylphenol; 2-(.alpha.-methylcyclohexyl)-4,6 dimethylphenol; 2,6-di-octadecyl-4-methylphenol; 2,4,6-tricyclohexyphenol; and 2,6-di-tert-butyl-4-methoxymethylphenol.

D.1.2 Alkylated Hydroquinones

For example, 2,6di-tert-butyl-4-methoxyphenol; 2,5-di-tert-butylhydroquinone; 2,5-di-tert-amyl-hydroquinone; and 2,6diphenyl-4-octadecyloxyphenol.

D.1.3 Hydroxylated Thiodiphenyl Ethers

For example, 2,2'-thio-bis-(6-tert-butyl-4-methylphenol); 2,2'-thio-bis-(4-octylphenol); 4,4'thio-bis-(6-tertbutyl-3-methylphenol); and 4,4'-thio-bis-(6-tert-butyl-2-methylphenol).

D. 1.4 Alkylidene-Bisphenols

For example, 2,2'-methylene-bis-(6-tert-butyl-4-methylphenol); 2,2'-methylene-bis-(6-tert-butyl-4-ethylphenol); 2,2'-methylene-bis-(4-methyl-6-(alpha-methylcyclohexyl) phenol); 2,2'-methylene-bis-(4-methyl-6-cyclohexyiphenol); 2,2'-methylene-bis-(6-nonyl-4-methylphenol); 2,2'-methylene-bis-(6-nonyl-4methylphenol); 2,2'-methylene-bis-(6-(alpha-methylbenzyl)-4-nonylphenol); 2,2'-methylene-bis-(6-(alpha, alpha-dimethylbenzyl)-4-nonylphenol); 2,2'-methylene-bis-(4,6-di-tert-butylphenol); 2,2'-ethylidene-bis-(6-tert-butyl-4-isobutylphenol); 4,4'methylene-bis-(2,6-di-tert-butylphenol); 4,4'-methylene-bis-(6-tert-butyl-2-methylphenol); 1,1-bis-(5-tert-butyl-4-hydroxy-2-methylphenol)butane 2,6-di-(3-tert-butyl-5-methyl-2-hydroxybenzyl)-4-methylphenol; 1,1,3-tris-(5-tert-butyl-4-hydroxy-2-methylphenyl)butane; 1,1-bis-(5-tert-butyl-4-hydroxy-2-methylphenyl)-3-dodecyl-mercaptobutane; ethyleneglycol-bis-(3,3-bis-(3'-tert-butyl-4'-hydroxyphenyl)-butyrate)-d-i-(3-tert-butyl-4-hydroxy-5-methylphenyl)-dicyclopentadiene; di-(2-(3'-tert-butyl-2'hydroxy-5'methylbenzyl)-6-tert-butyl-4-methylpheny-l) terephthalate; and other phenolics such as monoacrylate esters of bisphenols such as ethylidiene bis-2,4-di-t-butyl-phenol monoacrylate ester.

D.1.5 Benzyl Compounds

For example, 1,3,5-tris-(3,5-di-tert-butyl-4-hydroxybenzyl)-2,4,6-trimethylbenzene; bis-(3,5-di-tert-butyl-4-hydroxybenzyl)sulfide; isooctyl 3,5-di-tert-butyl-4-hydroxybenzyl-mercaptoacetate; bis-(4-tert-butyl-3hydroxy-2,6-dimethylbenzyl)dithiol-terephthalate; 1,3,5-tris-(3,5-di-tert-butyl-4,10hydroxybenzyl)isocyanurate; 1,3,5-tris-(4-tert-butyl-3-hydroxy-2,6-dimethylbenzyl)isocyanurate; dioctadecyl 3,5-di-tert-butyl-4-hydroxybenzylphosphonate;

calcium salt of monoethyl 3,5-di-tertbutyl-4-hydroxybenzylphosphonate; and 1,3,5-tris-(3,5-dicyclohexyl-4-hydroxybenzyl)isocyanurate.

D.1.6 Acylaminophenols

For example, 4-hydroxy-lauric acid anilide; 4-hydroxy-stearic acid anilide; 2,4-bis-octylmercapto-6-(3,5-tert-butyl-4-hydroxyanilino)-s-tria-zine; and octyl-N-(3,5-di-tert-butyl-4-hydroxyphenyl)-carbamate.

D.1.7 Esters of beta-(5-tert-butyl-4-hydroxy-3-methylphenyl)-propionic acid with Monohydric or Polyhydric Alcohols For example, methanol; diethyleneglycol; octadecanol; triethyleneglycol; 1,6-hexanediol; pentaerythritol; neopentylglycol; tris-hydroxyethyl isocyanurate; thidiethyleneglycol; and dihydroxyethyl oxalic acid diamide.

D.1.8 Amides of beta-(3,5-di-tert-butyl-4hydroxyphenol)-propionic acid

For example, N,N'-di-(3,5-di-tert-butyl-4-hydroxyphenylpropionyl)-hexamethylendiamine; N,N'-di-(3,5-di-tert-butyl-4-hydroxyphenylpropionyl)trimethylenediamine; and N,N'-di(3,5-di-tert-butyl-4-hydroxyphenylpropionyl)-hydrazine.

Part D.2—Hydroxylamines and Amine Oxides

The process of this invention is essentially free of hydroxylamine stabilizers. For example, N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamnine; N-heptadecyl-N-octadecylhydroxylamine; and N,N-dialkylhydroxylamine derived from hydrogenated tallow amine. The analogous amine oxides (as disclosed in U.S. Pat. No. 5,844,029, Prachu et al.) are also meant to be included by the definition of hydroxylamine (and thus are not used in the process of this invention).

Part D.3—Lactones

The process of this invention is essentially free of lactone stabilizers.

The use of lactones such as benzofuranone (and derivatives thereof) or indolinone (and derivatives thereof) as stabilizers is described in U.S. Pat. No. 4,611,016.

Melt Processing Operations

In general, the process described herein is suitable for processing molten thermoplastic polyolefins. The melt processing operations are conducted at temperatures from above the melting point of the thermoplastic polyolefin to as high as 400° C.

The present process is particularly suitable for extrusion operations, injection molding operations and rotomolding operations.

In one embodiment, the extrusion of polyethylene film is preferred. Examples of polyethylene film extrusion process include the blown film process and cast film process which are briefly described below.

In a blown film process, the polyethylene is melted in a screw extruder (preferably at a temperature of from 200 to 320° C., especially from 210 to 250° C.) and then forced through an annuler die to form a tube of molten polyethylene. The tube is inflated with air from the interior of the tube, then cooled and finally flattened by nip rolls. It is also known to co-extrude multi layers of film by this process.

In a cast film process, the polyethylene is also melted in a screw extruder (preferably at temperatures of from 450° F. (232° C.) to 600° F. (316° C.) especially from 500° F. (260° C.) to 550° F. (288° C.) and then forced through a flat die. The molten polyethylene web is then cooled (for example, through the use of a water bath or, alternatively, temperature controlled casting rolls).

In an injection molding process, the polyethylene is typically melted in a screw extruder and then rammed under very high pressures into a hollow mold.

In a rotomolding process, the polyethylene resin is ground into a fine powder, then charged into a hollow mold. The mold is then placed in a furnace and heated to temperatures of from 250° C. to 325° C. (especially from 520° F. (271° C.) to 600° F. (316° C.) while the mold is rotated. The molten plastic flows through the mold under the gentle (low shear) forces from the rotation.

The cast film process is challenging for stabilization systems because it combines high temperatures and high shear rates.

EXAMPLES

Example 1

A series of small scale experiments was completed to investigate the performance of various stabilizers. The experiments were undertaken in a fusion-head mixer (manufactured by C.W. Brabender Instruments, Inc.) equipped with roller mixing blades in a mixing bowl having a 40 cc capacity. The stabilizer formulations (shown in Table 1) were mixed with a thermoplastic polyethylene in the fusion-head mixer for a period of 10 minutes at 160° C.

The thermoplastic polyethylene used in all experiments of example 1 was an ethylene-octene copolymer having a density of about 0.920 g/cc and a melt index, 12 (as determined by ASTM D 1238) of about 1.0 grams per 10 minutes. This copolymer was produced in a solution phase polymerization process using a Zeigler-Natta type catalyst and contained about 8 parts per million by weight of residual titanium.

Two control experiments (C1 and C2) were conducted using a conventional stabilizer package (C1 contained 500 ppm of a phenolic ("AO1") and 500 ppm of a phosphite ("P1") sold under the trademarks IRGANOX 1076 and IRGAFOS 168, respectively, by Ciba Specialty Chemicals); while C2 contained 500 ppm of the IRGANOX 1076 phenolic ("AO2") and 500 ppm of tris (nonylphenyl) phosphite ("P2").

Inventive experiment IE1 was completed using a blend of two phosphite stabilizers at a loading level of 500 ppm each (IE1 contained 500 ppm P1 and 500 ppm P2 under the trademarks IRGAFOS 168 by BASF and WESTON 705 by Addivant, respectively.

It should be noted P1 was used as received in the form of a powder and that P2 was used as received in the form of a viscous liquid. A small experiment was conducted in which some of the P1 powder was added to the P2 liquid (in an amount of about 10% P1/90% P2). The P1 powder did not completely dissolve in the P2 liquid. However, the resulting liquid admixture was considered to be potentially suitable for use as a liquid suspension.

The resin was removed from the fusion-head mixer after the ten minute test and pressed into plaques. Color measurements were performed on the plaques in accordance with ASTM standards (yellow index or "YI" was determined according to ASTM D 1925 and whiteness index or "WI" was determined according to ASTM E313).

Low YI values and high WI values are desirable. Color data are also provided in Tables 1 and 2.

TABLE 1

Color data for various additive formulations

| Formulation | AO1 | AO2 | P1 | P2 | Color (YI) | Color (WI) |
|---|---|---|---|---|---|---|
| C1 | 500 | | 500 | | −1.8 | 67 |
| C2 | | 500 | 500 | | −0.6 | 64 |
| IE1 | | | 500 | 500 | −3.1 | 70 |

TABLE 2

Color stability data for various additive formulations after multiple extrusion pass experiment (225° C.)

| Extrusion Pass # | C1 | C2 | IE1 |
|---|---|---|---|
| 0 | −1.8 | −0.6 | −3.1 |
| 1 | 3.2 | 5.2 | −1.9 |
| 3 | 8.2 | 9.8 | −0.3 |
| 5 | 11.1 | 12.6 | 0.9 |

TABLE 3

Change in color data (YI) for various additive formulations after exposure to atmospheric fume chamber

| Days Exposed | C1 | C2 | 1E1 |
|---|---|---|---|
| 0 | 11.00 | 1.50 | 1.53 |
| 1 | 11.00 | 3.72 | 1.61 |
| 3 | 12.52 | 6.43 | 1.36 |
| 4 | 13.32 | 7.10 | 1.10 |
| 8 | 13.78 | 10.19 | 0.88 |
| 14 | 15.60 | 13.27 | 0.75 |
| 21 | 17.77 | 15.72 | 0.93 |
| 28 | 20.35 | 18.40 | 0.56 |

The color data shown in Table 1 clearly indicate that the comparative stabilizer packages generate undesirable color under the conditions of this experiment. The YI and WI of the resin of experiment C1 were—1.8 and 67, respectively, while the color levels produced in C2 were marginally worse.

The longer term color stability of the test plaques was also tested in a "gas fading" test. The gas fading test is based on Test Method 23-1999 of the American Association of Textile Chemists and Colorists. The test is conducted in a test chamber (sold by Instrument Marking Service as model #8727ES) which is equipped with a bunsen burner. Natural gas at a pressure of about 0.14 pounds per square inch gauge (1 KPa gauge) is burned in the chamber so as to expose the test plaques to combustion gasses. The temperature of the chamber is controlled to 140° F. (60° C.) by using an exhaust fan which expels hot air and draws fresh air into the combustion zone. Color testing on the plaques is recorded over a period of 28 days. This test is used to simulate the effect of exposing polyethylene films to warehouse storage conditions (where combustion fumes from propane powered fork lifts are known to cause color formation in plastic films). "Gas fading" data are reported in Table 3.

Example 2

The desirable "color" performance illustrated in Example 1 is of little practical value unless the stabilizer package also provides "melt flow stability". As previously noted, a useful stabilizer package must provide some protection against chain scission reactions in polypropylene (leading to an increase in melt index) and crosslinking reactions in polyethylene. The problems caused by crosslinking of polyethylene are manifested in changes in the physical properties of the finished polyethylene good. For example, a crosslinking reaction in polyethylene used to prepare film may cause a loss of elongation, impact strength and machine direction (MD) tear strength.

The experiments of this example were performed on a twin screw extruder. For the purpose of this evaluation the temperature profile was set to obtain a melt temperatures 225° C. Melt index (I21) was measured after passes 0, 1, and 3 in accordance with ASTM standard D1238 A at 190° C. using a 21.6 kg weight. A summary of melt flow stability is for each additive package is provided in Table 4 where the smallest deviation from pass 0 is desirable. $I_{21}$ data are reported in units of grams per 10 minutes.

TABLE 4

Melt index ($I_{21}$), g/10 minutes, for various additive formulations after multiple extrusion pass experiment (225° C.)

| Extrusion Pass # | C1 | C2 | IE1 |
|---|---|---|---|
| 0 | 24.9 | 25.2 | 24.8 |
| 1 | 23.3 | 23.8 | 23.0 |
| 3 | 20.8 | 21.1 | 19.1 |

For clarity, the $I_{21}$ value of comparative composition C1 decreased from 24.5 to 20.8 g/10 minutes after three passes.

What is claimed is:

1. A process for stabilizing a thermoplastic polyolefin during melt processing conditions said process comprising the step of incorporating into said thermoplastic polyolefin a stabilizer package comprising:
   (i) a first phosphite: tris(2-4-di-tert-butylphenyl)phosphite; and
   (ii) a second phosphite composition consisting essentially of phosphorous acid, mixed 2,4-bis(1,1-dimethylpropyl)phenyl and 4-(1,1-dimethylpropyl) phenyl triesters; and
   (iii) an acid neutralizer;
and subjecting said thermoplastic polyolefin to sufficient temperature to melt said polyolefin;
with the proviso that said stabilizer package is essentially free of any additive selected from hindered phenolic antioxidants, lactone stabilizers and hydroxylamine stabilizers.

2. The process according to claim 1 wherein said stabilizer formulation further comprises a hindered amine light stabilizer.

3. The process according to claim 1 wherein said thermoplastic polyolefin is a linear polyethylene which contains from 0.5 to 10 ppm of at least one transition metal selected from titanium, vanadium, zirconium and chromium.

4. The process according to claim 3 wherein said linear polyethylene is a copolymer of ethylene and at least one olefin selected from butene, pentene, hexene and octene.

5. The process according to claim 4 wherein said linear polyethylene has a density of from 0.880 to 0.960 g/cc and a melt index, $I_2$, as determined by ASTM D1238 of from 0.3 to 150 g/10 minutes.

6. The process according to claim 5 wherein said melt processing conditions comprise a film extrusion at a temperature of from 200° C. to 320° C.

* * * * *